United States Patent
Vandiver et al.

(10) Patent No.: US 11,126,656 B2
(45) Date of Patent: Sep. 21, 2021

(54) FORMATTING SEMI-STRUCTURED DATA IN A DATABASE

(71) Applicant: HEWLETT-PACKARD DEVELOPMENT COMPANY, L.P., Houston, TX (US)

(72) Inventors: Benjamin M. Vandiver, Cambridge, MA (US); Adam Benjamin Seering, Cambridge, MA (US); Matthew Steven Fuller, Cambridge, MA (US)

(73) Assignee: MICRO FOCUS LLC, Santa Clara, CA (US)

(*) Notice: Subject to any disclaimer, the term of this patent is extended or adjusted under 35 U.S.C. 154(b) by 923 days.

(21) Appl. No.: 14/765,011

(22) PCT Filed: Feb. 7, 2013

(86) PCT No.: PCT/US2013/025108
§ 371 (c)(1),
(2) Date: Jul. 31, 2015

(87) PCT Pub. No.: WO2014/123529
PCT Pub. Date: Aug. 14, 2014

(65) Prior Publication Data
US 2015/0370917 A1    Dec. 24, 2015

(51) Int. Cl.
*G06F 16/84* (2019.01)
*G06F 16/835* (2019.01)
*G06F 16/22* (2019.01)

(52) U.S. Cl.
CPC ............ *G06F 16/86* (2019.01); *G06F 16/221* (2019.01); *G06F 16/835* (2019.01)

(58) Field of Classification Search
CPC .. G06F 17/30917; G06F 16/86; G06F 16/221; G06F 16/835
See application file for complete search history.

(56) References Cited

U.S. PATENT DOCUMENTS

| | | | |
|---|---|---|---|
| 7,024,425 B2 * | 4/2006 | Krishnaprasad | G06F 16/284 |
| 7,028,028 B1 * | 4/2006 | Balmin | G06F 17/30917 707/760 |
| 7,096,224 B2 * | 8/2006 | Murthy | G06F 16/86 707/763 |
| 7,120,645 B2 * | 10/2006 | Manikutty | G06F 16/86 |
| 7,209,923 B1 | 4/2007 | Cooper | |
| 7,415,461 B1 * | 8/2008 | Guha | G06F 17/30696 |

(Continued)

FOREIGN PATENT DOCUMENTS

| | | |
|---|---|---|
| EP | 2500848 | 9/2012 |
| WO | WO-2003042873 A1 | 5/2003 |

OTHER PUBLICATIONS

Ronald Bourret, "XML and Databases", 2005.*

(Continued)

*Primary Examiner* — Irete F Ehichioya
*Assistant Examiner* — Huen Wong (57) ABSTRACT

In some examples, formatting semi-structured data in a database includes obtaining semi-structured data in a column store database, assigning the semi-structured data to a semi-structured column with a key and value format, and formatting the semi-structured data with an optimal search format.

17 Claims, 5 Drawing Sheets

(56) References Cited

U.S. PATENT DOCUMENTS

| | | | |
|---|---|---|---|
| 8,219,561 B2* | 7/2012 | Stork | G06F 16/2448 707/740 |
| 2002/0078068 A1* | 6/2002 | Krishnaprasad | G06F 17/30595 |
| 2003/0065936 A1* | 4/2003 | Wray | G06F 21/31 726/4 |
| 2003/0120642 A1 | 6/2003 | Egilsson et al. | |
| 2004/0064466 A1* | 4/2004 | Manikutty | G06F 17/30917 |
| 2004/0163041 A1* | 8/2004 | Engel | G06F 16/86 715/234 |
| 2005/0091188 A1* | 4/2005 | Pal | G06F 17/30911 |
| 2010/0057556 A1* | 3/2010 | Rousso | G06Q 30/02 705/14.44 |
| 2010/0299327 A1* | 11/2010 | Kiefer | G06F 17/30917 707/736 |
| 2011/0302189 A1* | 12/2011 | Liu | G06F 17/30929 707/769 |
| 2011/0307521 A1 | 12/2011 | Slezak et al. | |
| 2012/0047186 A1 | 2/2012 | Shadmon et al. | |
| 2012/0303633 A1 | 11/2012 | He et al. | |
| 2013/0262425 A1* | 10/2013 | Shamlin | G06F 17/30566 707/703 |
| 2015/0095290 A1* | 4/2015 | Saliba | G06F 11/1402 707/674 |
| 2015/0261772 A1* | 9/2015 | Lorenz | G06F 17/30303 707/723 |

OTHER PUBLICATIONS

Murthy et al., "XML Schemas in Oracle XML DB".*
Abadi, D.J., Query Execution in Column-oriented Database Systems (Research Paper), Feb. 1, 2008, 148 Pages.
Coffman, J., Effective Searching in Structured Data, May 2009, Retrieved from the Internet: <http://www.cs.virginia.edu/-jmc7tp/papers/thesis.pdf> [retrieved on Feb. 4, 2014], Thesis, 82 pages.
International Search Report and the Written Opinion, dated Nov. 14, 2013, PCT Patent Application No. PCT/US2013/025108, 11 Pages.
Mansuri, I.R., et al., Integrating Unstructured Data into Relational Databases (Research paper), Retrieved from the Internet: <http://www.it.iitb.ac.in/~sunita/papers/icde06a.pdf> [retrieved on Feb. 4, 2014], 12 Pages.

* cited by examiner

FORMATTING SEMI-STRUCTURED DATA IN A DATABASE

BACKGROUND

Databases use a variety of formats to organize data to be searched in response to search queries. One such type of database organization includes organizing the data sequentially in rows. In response to a search query, each row is read sequentially from the beginning of the row to locate data pertaining to the search query. Another type of database is a column store database that stores data in columns instead of rows. Such databases locate information in each column without having to read a sequential list of data irrelevant to the search query. Thus, column store databases utilize different searching techniques to search for data pertaining to the search queries than row store databases.

BRIEF DESCRIPTION OF THE DRAWINGS

The accompanying drawings illustrate various examples of the principles described herein and are a part of the specification. The illustrated examples are merely examples and do not limit the scope of the claims.

DETAILED DESCRIPTION

Relational databases, such as column store databases, perform searches where the data is organized in fixed and consistent formats across all records. While this schema can be changed to include additional column values, such an action is driven by the user instead of being performed implicitly by the column store database. As such, the process of loading a new type of data into the database involves the user executing a schema definition task before the data is loaded. Furthermore, the user executing the schema definition task is knowledgeable enough about the data to accurately define the column counts and data types (including string field max widths), so that the column store database can fit the newly added data into its existing fixed and consistent format.

The schema definition task can be a barrier to entering data into relational databases. Additionally, the user may not be knowledgeable enough about the new data to formulate a tight schema. Once the data is loaded, a query language like Structured Query Language (SQL) is adequate for expressing the analysis to be performed.

Many of the data sets are self-describing and include metadata about the column names, descriptions, and types. For example, the JavaScript Object Notation (JSON) format describes columns and data types. Even simple delimited formats like Comma-Separated Values (CSV) or Tab Separated Values (TSV) often have a header row at the top that describes column names.

Variable schema, where the data's records are inconsistent due to changes in the content of a record or due to multiple record types being present in a single stream of data, also presents an issue to a fixed-schema relational database. Records may be lacking fields, or newer versions of the data source may supply additional fields. Multiple different record types may arrive on the same stream. Such new data also does not fit neatly within the tight schema of the relational database.

The principles described herein include a method for formatting semi-structured data in a database. Such a method includes obtaining semi-structured data in a column store database, assigning the semi-structured data to a semi-structured column with a key and value format, and formatting the semi-structured data with an optimal search format. The semi-structured data may include data that is unknown to the database or data that has inconsistent formats across different records. The semi-structured data may include other types of data that does not fit neatly into the tight schemas used for relational databases for optimizing searches. The key and value format includes a format where key data and their associated values are paired together as a pair that can be searched within the semi-structured column. Optimal search formats include additional information and/or structure than just the key and value pairs. Such additional information and/or structure improve search engines' abilities to search the semi-structured data. Such additional information may include metadata that provides keywords, tags, descriptions, other values, additional indexing information, other information, or combinations thereof that can be used in a tight schema to allow optimal search times in the semi-structured column.

One advantage of the principles described herein includes that a user writing a query does not have to know whether the data is sourced to the semi-structured column or to an explicit column with more structure. Thus, the storage function is separated from the querying function.

In the following description, for purposes of explanation, numerous specific details are set forth in order to provide a thorough understanding of the present systems and methods. It will be apparent, however, to one skilled in the art that the present apparatus, systems, and methods may be practiced without these specific details. Reference in the specification to "an example" or similar language means that a particular feature, structure, or characteristic described is included in at least that one example, but not necessarily in other examples.

Figure 1:
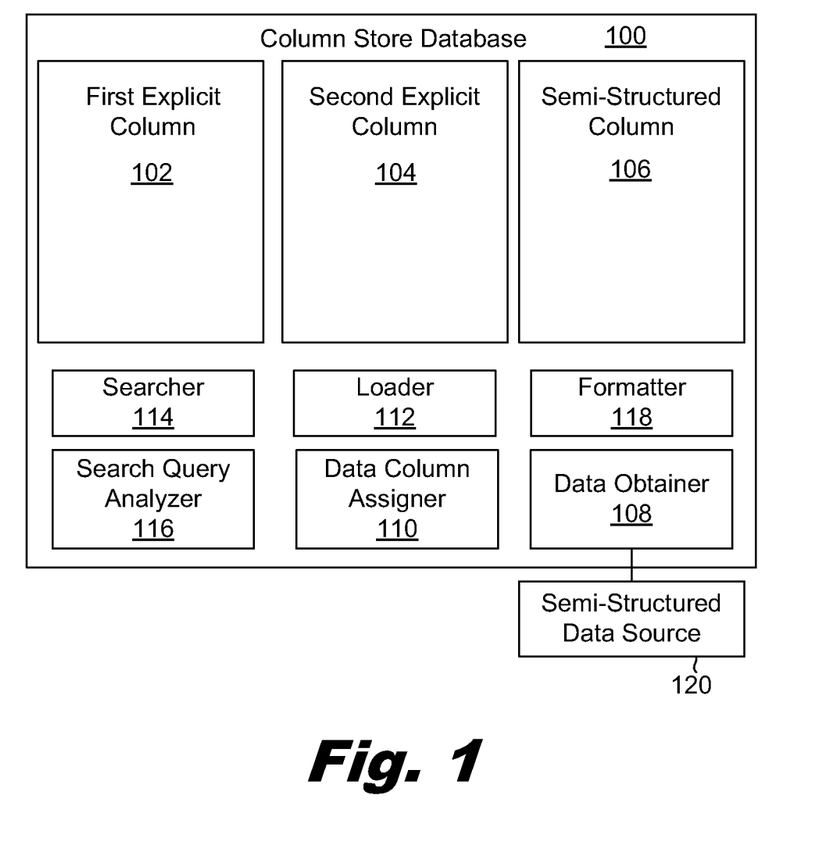
FIG. 1 is a diagram of an example of a column store database according to the principles described herein.

FIG. 1 is a diagram of an example of a column store database (100) according to the principles described herein. In this example, the column store database (100) has a first explicit column (102), a second explicit column (104), and a semi-structured column (106). The column store database (100) also includes a data obtainer (108), a data column assigner (110), a loader (112), a searcher (114), a search query analyzer (116), and a formatter (118). Further, in this example, a semi-structured data source (120) is in communication with the data obtainer (108).

The data obtainer (108) obtains data from the semi-structured data source. The semi-structured data source may be a removable memory medium, another database, a website, a directory, a library, manual inputs from a user, a system, monitoring equipment, other sources, or combinations thereof. The semi-structured data may have a format that is unknown to the column store database (100). In other examples, the semi-structured data has inconsistent formats across multiple records due to deletions or other changes to the records. Other conditions of data may cause the data's structure to fall outside of an optimal search format with which the rest of the data in the column store database is organized. The data obtainer (108) may passively receive the data from the semi-structured data source (120), or the data obtainer (108) may actively retrieve data from the semi-structured data source. While this example has been described with reference to specific features of a data obtainer (108), any appropriate type of data obtainer may be used in accordance with the principles described herein.

The data obtainer (108) is in communication with the data column assigner (110) which determines whether the data has a format compatible with the rest of the column store database's organization. Further, the data column assigner (110) also determines whether the records of the data are formatted in a consistent manner. If the data's format is unknown or is inconsistent, the data column assigner (110) assigns the data to the semi-structured column (106). On the other hand, if the data is organized in a manner consistent with the column store database's optimal search format, the data is assigned to either an existing explicit column, such as the first or second explicit columns (102, 104) or a new explicit column is formed for the new data.

In some examples, the data column assigner (110) recognizes that some of the incoming data obtained at the data obtainer (108) belongs to data that is already stored in one of the currently existing columns. In such an example, the data column assigner (110) may assign the data to the currently existing explicit column. Alternatively, the data column assigner (110) assigns the data recognized to belong to data already in an explicit column to both the semi-structured column and to the appropriate explicit column. While this example has been described with reference to specific features of a data column assigner (110), any appropriate type of data column assigner may be used in accordance with the principles described herein.

In response to the data column assigner (110) assigning the data to a column, the loader (112) loads the data into the assigned column. While this example has been described with reference to specific features of a loader (112), any appropriate type of loader (112) may be used in accordance with the principles described herein.

The searcher (114) searches the column store database in response to search queries. In some examples, if a search query fails to include information that is in the explicit columns, the searcher (114) will search the semi-structured column (106) for data pertaining to the search query. If query data is available from the explicit columns, the semi-structured column is not read. In this manner, the input/output cost of searching data in the semi-structured column is reduced and/or eliminated. In other examples, the searching policy indicates that the semi-structured column is just searched when no other pertinent information is found throughout the rest of the database. In yet other examples, the search policy includes a rule that indicates that if other conditions are met, the searcher (114) is to search the semi-structured column (106). While this example has been described with reference to specific features of a searcher (114), any appropriate type of searcher may be used in accordance with the principles described herein.

The search query analyzer (116) analyzers the search queries to determine how to format the semi-structured data according to an analyzing policy. The analyzing policy may include a rule that indicates that just those search queries that found relevant information in the semi-structured column are to be analyzed. In other examples, the analyzing policy includes a rule that indicates that all search queries that fail to find relevant information in the explicit columns are to be analyzed. In yet other examples, other rules that account for other conditions are used to determine which of the search queries are to be analyzed. While this example has been described with reference to specific features of a search query analyzer (116), any appropriate type of search query analyzer may be used in accordance with the principles described herein.

Based on the analysis of search queries, the formatter (118) formats the semi-structured data to give the semi-structured data more detail to make the semi-structured data more optimal for searching. In some examples, portions of the semi-structured data are extracted from the semi-structured data to be placed in newly created explicit columns with additional formatting to make the data better suited for searching. In other examples, the semi-structured column itself is given additional structure to make its contents more optimal for searching. While this example has been described with reference to specific features of a formatter (118), any appropriate type of formatter may be used in accordance with the principles described herein.

Figure 2:
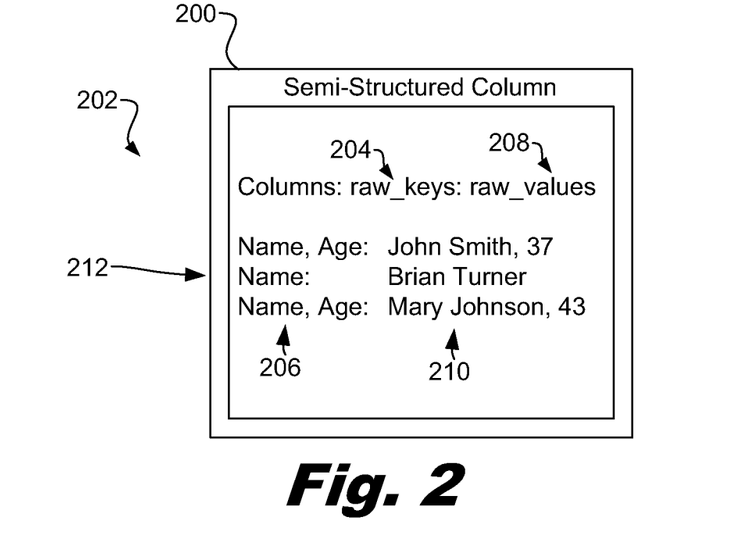
FIG. 2 is a diagram of an example of a semi-structured column with a key and value format according to the principles described herein.

FIG. 2 is a diagram of an example of a semi-structured column (200) with a key and value format (202) according to the principles described herein. In this example, the semi-structured column (200) has a first sub-column (204) dedicated to identifying keys (206). The semi-structured column (200) also has a second sub-column (208) dedicated to identifying the corresponding values (210) of the keys (206).

Each record is stored in a binary dictionary format as a pair that represents the keys and their corresponding values. The values may be binary numeric values or symbols that can be converted into binary numeric values, or combinations thereof. In other examples, the keys/values semi-structured columns are implemented in the database as simple wide varbinary and/or blob values. In the example of FIG. 2, each of the keys (206) is a name or age stored in a keys column (204). Similarly, each of the values (210) is stored in a values column (208) that corresponds to its key (206). In examples where each of the keys is of the same type, the semi-structured column (200) can be compressed nearly to the same degree that the explicit columns are compressed. However, in this example, the keys (206) are of different types. Further, more information may be contained in the semi-structured column (200) than just key value pairs. However, the key value pairs may be extracted from the rest of the semi-structured data and stored in a location that is easy to search.

When data is loaded to the database, the key/value pair will be evaluated to determine whether to load the data to an explicit column or a semi-structured column. For example, if the key matches the name of an existing explicit column, the key value pair is loaded into the explicit column. On the other hand, if the key does not match an existing column, the key value pair is stored in the semi-structured columns.

Record (212) is missing an age key and value. Missing keys and values may result from deletions before the data was loaded to the semi-structured column (200). In other examples, the keys and value were merely not entered. Such an example occurs if Mr. Brian Turner fails to input his age when he inputted his name into the database. Such a missing value causes the records of this data to be inconsistent across the records. Such inconsistencies will cause the data to be classified as semi-structured data. Further, when a query requesting "age" is executed, the record will receive a SQL null response indicating that the value is unknown.

As described above, if all of the keys and values pairs across all records are consistent, the semi-structured column will compress well. In such an example, the semi-structured column may be classified as an explicit column. By applying such an indexing mechanism, search queries naming the explicit column's name are quick to execute. For example, queries that include an "average age of people whose name starts with 'B'" are quick to execute because the semi-structured key/value column just needs to be read for records whose name column starts with 'B.'

When a SQL query references a column that does not exist in the column store database, the column reference is rewritten into a function call to extract the named field from the binary dictionary column. If many records have exactly the same set of keys, the keys' column easily compresses. This situation can arise when data with a fixed schema is loaded into the unstructured table, which is a scenario where the resource cost of storing the record schema is minimized.

While the semi-structured column makes the data accessible, the semi-structured column fails to provide all of the optimal searching characteristics in the formats of the explicit columns. In the explicit columns, the column store database sorts and compresses the data to maximize input/output utilization, minimize disk footprint, and provide indexing functionality. A database designer tool automates the process of the physical design ensuring that less experienced users can achieve good performance. Java programs can be used to determine which semi-structured columns to reformat based on their data and how they are queried. The Java programs rebuild the semi-structured column with the new sub-columns and invoke the column store database's existing database design to choose the optimal physical layout to re-format the semi-structured data.

In response to at least one search query, the formatting of the semi-structured column may change to include additional information. For example, if a search query sought for the names of executives in Company B and no other information in the column store database included reference to Company B, the searcher may cause a search to be done in the semi-structured column. The search query analyzer may determine that the names from semi-structured data are names of executives from Company B. In response to such a determination, metadata may be added to reformat the semi-structured column to indicate that the names are executives of Company B. Thus, subsequent search queries looking for information about executives from Company B may be executed faster.

While this example has been described with reference to a specific mechanism for analyzing search queries, any appropriate mechanism for analyzing search queries may be used. For example, any appropriate number of search queries may be analyzed. Also, accuracy factors may be included to ensure that inferences about what types of metadata to add to a semi-structured column have a high likelihood of being accurate. The search queries themselves may be subject to scrutiny as well. For example, a search term that merely includes a single parameter may be excluded from being analyzed according to an analysis policy. On the other hand, a search query including at least three or more parameters, such as "John Smith," "executives," and "Company B" may be analyzed because such search parameters give a stronger inference that John Smith and the other names in the semi-structured column are executives from Company B.

Figure 3:
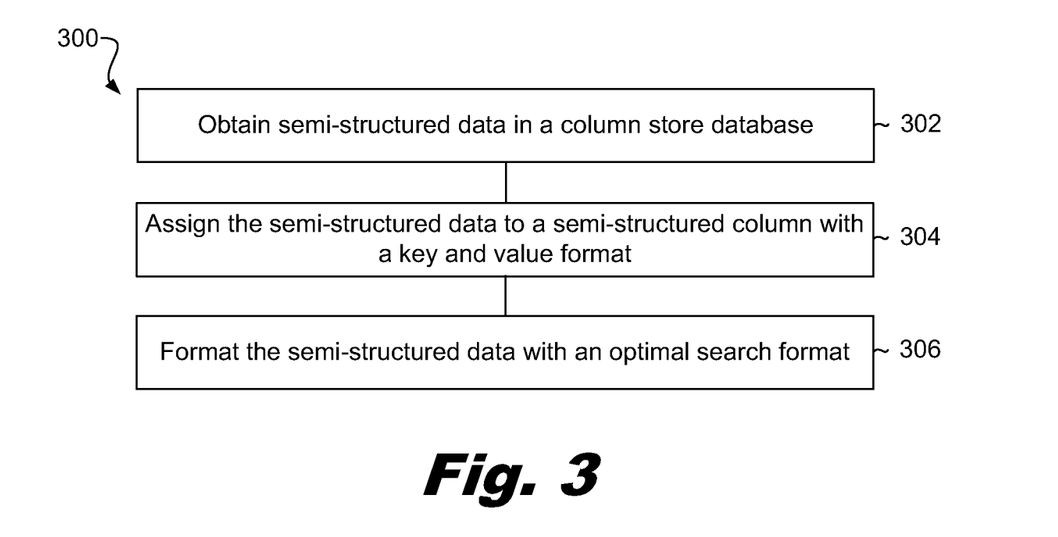
FIG. 3 is a diagram of an example of a method for formatting semi-structured data in a database according to the principles described herein.

FIG. 3 is a diagram of an example of a method (300) for formatting semi-structured data in a database according to the principles described herein. In this example, the method (300) includes obtaining (302) semi-structured data in a column store database, assigning (304) the semi-structured data to a semi-structured column with a key and value format, and formatting (306) the semi-structured data with an optimal search format.

The method may also include searching the semi-structured column in response to search queries. The semi-structured column may be searched if just information relevant to the search query is not found elsewhere in the column store database. Formatting the semi-structured data with an optimal search format may include analyzing the search queries for semi-structured data and basing a format of the semi-structured data on the search queries.

The method may also include determining whether the semi-structured data is recognized by the column store database. If at least some of the semi-structured data is recognized by the column store database, the semi-structured data is assigned to both the semi-structured column and an explicit column of the column stored database.

Figure 4:
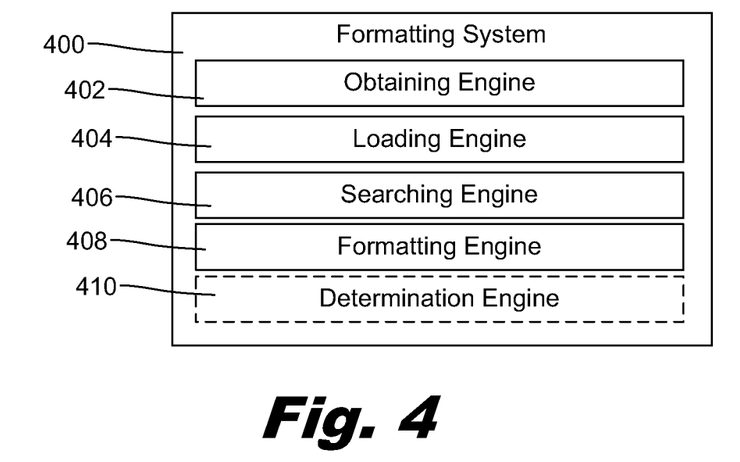
FIG. 4 is a diagram of an example of a formatting system according to the principles described herein.

FIG. 4 is a diagram of an example of a formatting system (400) according to the principles described herein. The formatting system (400) includes an obtaining engine (402), a loading engine (404), a searching engine (406), and a formatting engine (408). Further, in this example, the formatting system (400) also includes a determination engine (410). The engines (402, 404, 406, 408, 410) refer to a combination of hardware and program instructions to perform a designated function. Each of the engines (402, 404, 406, 408, 410) may include a processor and memory. The program instructions are stored in the memory and cause the processor to execute the designated function of the engine.

The obtaining engine (402) obtains semi-structured data from a semi-structured source. The obtaining engine (402) may passively receive the information, such as in response to a user manually inputting the data or to a user downloading the information. In other examples, the obtaining engine (402) actively requests the information, such as when the formatting engine (400) is seeking to get updates about information already stored in the column store database.

The loading engine (404) loads the data into the appropriate column in the column store database. For example, the loading engine (404) can load the data into the semi-structured column if the data is classified as semi-structured data, load the data into an explicit column if the data is already formatted in such a way to allow for optimal searching, or load the data into both an explicit column and a semi-structured column as appropriate as described above.

The searching engine (406) may search the database in response to receiving a search query. The search query may be inputted by a user who may or may not know whether the data is sourced to the semi-structured column or an explicit column. In other examples, the search query is generated by a program that seeks information for a different program and/or system.

The formatting engine (408) formats the semi-structured data in such a way to optimize the semi-structured data for searching. In some examples, the semi-structured data, or at least portions of the semi-structured data, are extracted from the semi-structured column and placed in a newly generated column with additional formatting. In other examples, the semi-structured column is re-formatted to include additional structure than just key value pairs to increase the column's searchability.

The determination engine (410) determines whether the data is semi-structured data, non-structured data, or optimally formatted data. In examples where the data is already optimally formatted, the data is assigned to an existing column. If the data is non-structured, the data may be sent to a different process to handle such data or the non-structured data's entry merely fails. The semi-structured data is loaded as described above.

Figure 5:
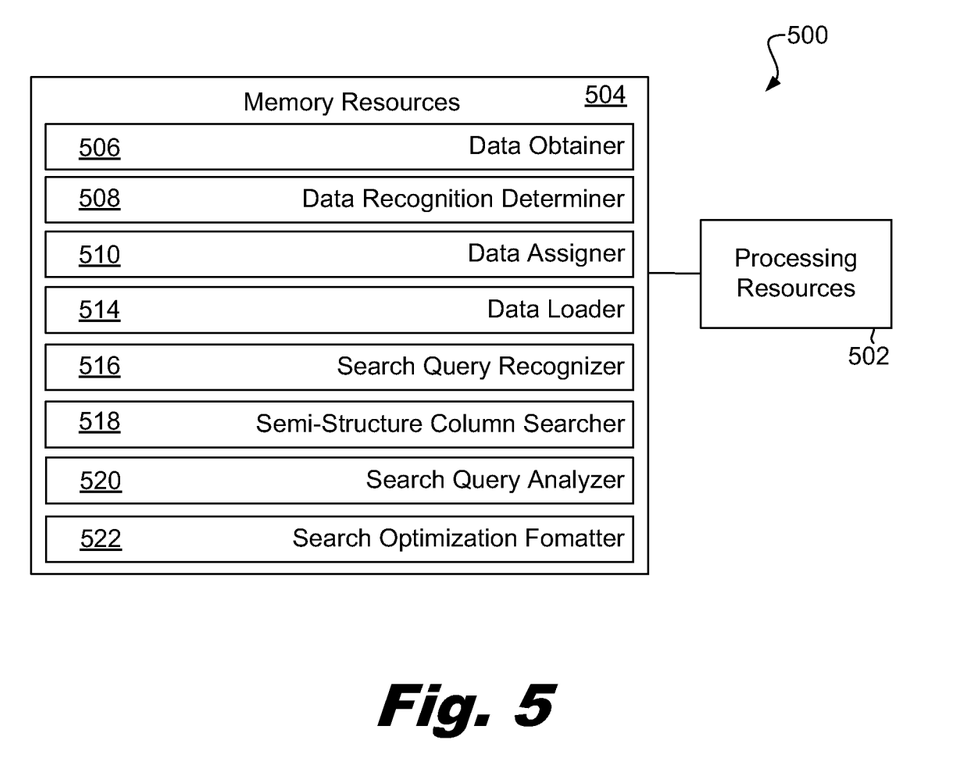
FIG. 5 is a diagram of an example of a formatting system according to the principles described herein.

FIG. 5 is a diagram of an example of a formatting system (500) according to the principles described herein. In this example, the formatting system (500) includes processing resources (502) that are in communication with memory resources (504). Processing resources (502) include at least one processor and other resources used to process programmed instructions. The memory resources (504) represent generally any memory capable of storing data such as programmed instructions or data structures used by the formatting system (500). The programmed instructions shown stored in the memory resources (504) include a data obtainer (506), data recognition determiner (508), data assigner (510), data loader (514), search query recognizer (516), semi-structured column searcher (518), search query analyzer (520), and search optimization formatter (522).

The memory resources (504) include a computer readable storage medium that contains computer readable program code to cause tasks to be executed by the processing resources (502). The computer readable storage medium may be tangible and/or non-transitory storage medium. The computer readable storage medium may be any appropriate storage medium that is not a transmission storage medium. A non-exhaustive list of computer readable storage medium types includes non-volatile memory, volatile memory, random access memory, memristor—based memory, write only memory, flash memory, electrically erasable program read only memory, magnetic storage media, or types of memory, or combinations thereof.

The data obtainer (506) represents programmed instructions that, when executed, cause the processing resources (502) to obtain data from a semi-structured data source. The data recognition determiner (508) represents programmed instructions that, when executed, cause the processing resources (502) to determine whether the column store database recognizes the information obtained with the data obtainer (506). The data assigner (510) represents programmed instructions that, when executed, cause the processing resources (502) to assign the data to an appropriate column. The data assigner (510) assigns the data to go to a semi-structured column if the column store database does not recognize the information and the data is semi-structured. On the other hand, if the data is semi-structured and the column store database does recognize that the data belongs with other information already stored in the database, the data assigner (510) assigns the data to both the semi-structured column and to the appropriate explicit column. The data loader (514) represents programmed instructions that, when executed, cause the processing resources (502) to load the data into the appropriate column as assigned by the data assigner (510).

The search query recognizer (516) represents programmed instructions that, when executed, cause the processing resources (502) to recognize search queries to search the column store database. The semi-structured column searcher (518) represents programmed instructions that, when executed, cause the processing resources (502) to search the semi-structured column if a searching policy indicates that the semi-structured column should be search for information pertaining to the search query.

The search query analyzer (520) represents programmed instructions that, when executed, cause the processing resources (502) to analyze the search queries that caused the semi-structured column to be search. The search optimization formatter (522) represents programmed instructions that, when executed, cause the processing resources (502) to format the semi-structured data based on the analysis of the search queries.

Further, the memory resources (504) may be part of an installation package. In response to installing the installation package, the programmed instructions of the memory resources (504) may be downloaded from the installation package's source, such as a portable medium, a server, a remote network location, another location, or combinations thereof. Portable memory media that are compatible with the principles described herein include DVDs, CDs, flash memory, portable disks, magnetic disks, optical disks, other forms of portable memory, or combinations thereof. In other examples, the program instructions are already installed. Here, the memory resources can include integrated memory such as a hard drive, a solid state hard drive, or the like.

In some examples, the processing resources (502) and the memory resources (504) are located within the same physical component, such as a server, or a network component. The memory resources (504) may be part of the physical component's main memory, caches, registers, non-volatile memory, or elsewhere in the physical component's memory hierarchy. Alternatively, the memory resources (504) may be in communication with the processing resources (502) over a network. Further, the data structures, such as the libraries and may be accessed from a remote location over a network connection while the programmed instructions are located locally. Thus, the formatting system (500) may be implemented on a user device, on a server, on a collection of servers, or combinations thereof.

The formatting system (500) of FIG. 5 may be part of a general purpose computer. However, in alternative examples, the formatting system (500) is part of an application specific integrated circuit.

Figure 6:
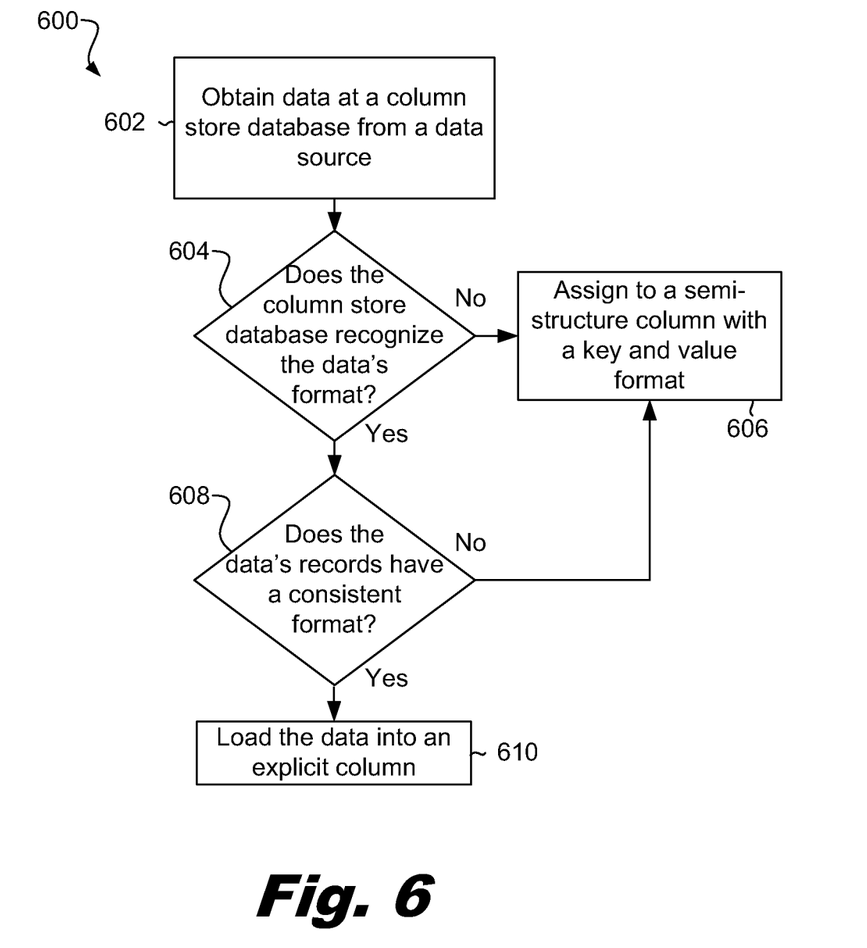
FIG. 6 is a diagram of an example of a flowchart of a process for loading semi-structured data into a database according to the principles described herein.

FIG. 6 is a diagram of an example of a flowchart (600) of a process for loading semi-structured data into a database according to the principles described herein. In this example, the process includes obtaining (602) data at a column store database from a data source and determining (604) whether the column store database recognizes the data's format. If the column store database does not recognize the data's format, the data is assigned (606) to a semi-structured column with a key and value format. If the column store database recognizes the data's format, the process includes determining (608) whether the data has a consistent format across multiple records. If the data does not have a consistent format across multiple records, the data is assigned (606) to the semi-structured column. However, if the data does have a consistent format across multiple records, the data is loaded (610) to an explicit column. The explicit column may be a pre-existing column or a column that is generated in response to the assignment.

Figure 7:
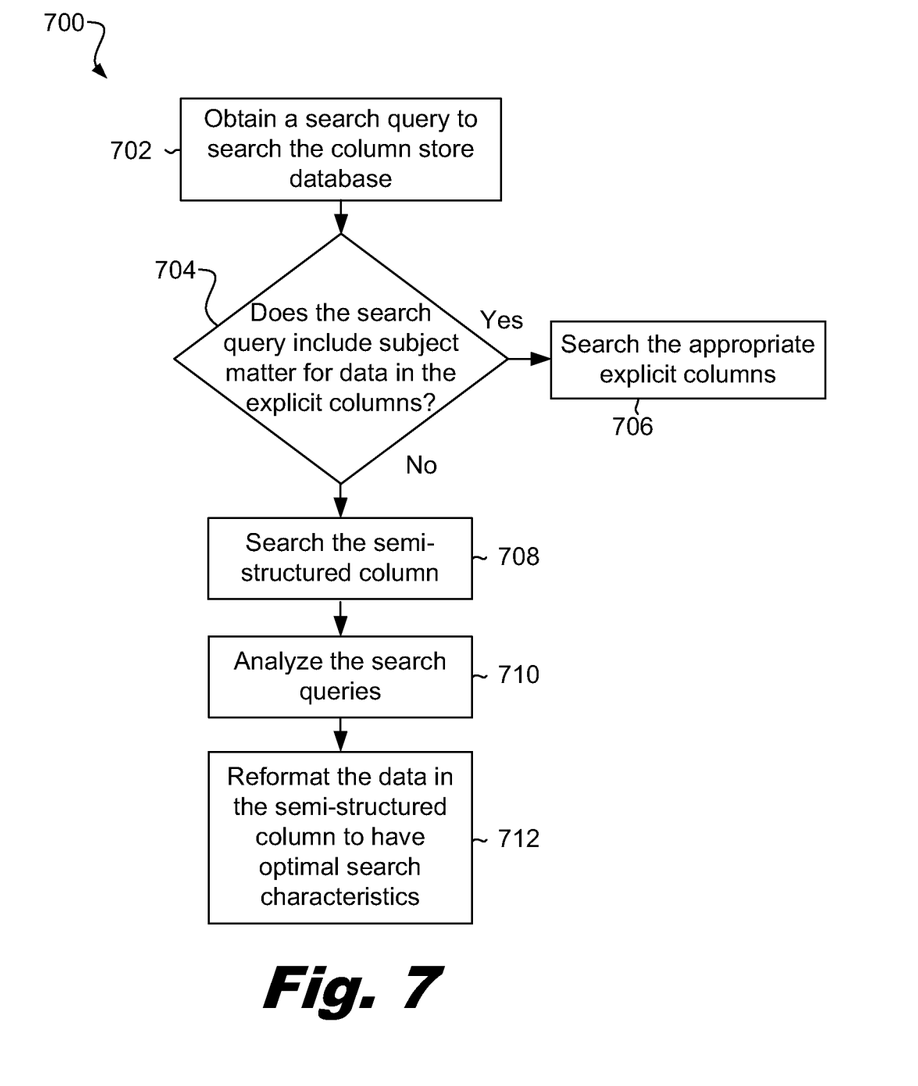
FIG. 7 is a diagram of an example of a flowchart of a process for formatting semi-structured data in a database according to the principles described herein.

FIG. 7 is a diagram of an example of a flowchart (700) of a process for formatting semi-structured data in a database according to the principles described herein. In a querying procedure, the process includes obtaining (702) a search query to search the column store database and determining (704) whether the search query includes subject matter for data in the explicit columns. If the search query includes information for the explicit columns, the appropriate explicit columns are searched (706) for information pertaining to the search query. However, if the search query does not include information for the explicit columns, the process includes searching (708) the semi-structured column.

In an optimizing procedure, the process includes, analyzing (710) the search queries and reformatting (712) the data in the semi-structured column to have optimal search characteristics. The querying procedure and the optimizing procedure may be independent procedures that are executed separately.

The principles described herein allow data that would not otherwise fit well within the existing schema of the column store database to be uploaded into the database. After this semi-structured data in uploaded, the column store database determines how to structure the data to increase the data's searchability.

While the examples above have been described with reference to specific types of column store databases and semi-structured columns, any appropriate column store database or semi-structured columns may be used in accordance with the principles described herein. Further, while the examples above have been described with reference to specific mechanisms for analyzing search queries and mechanisms for selecting search queries to analyze, any appropriate mechanisms for analyzing search queries or selecting search queries may be used in accordance to the principles described herein. Also, while the examples above have been described with reference to specific mechanisms for determining where to assign semi-structured data, any appropriate mechanism for determining where to assign semi-structured data may be used in accordance to the principles described herein.

The preceding description has been presented only to illustrate and describe examples of the principles described. This description is not intended to be exhaustive or to limit these principles to any precise form disclosed. Many modifications and variations are possible in light of the above teaching.

What is claimed is:

1. A method for formatting semi-structured data in a column store database, comprising:
   receiving data from a data source to be stored in one of a plurality of columns of the column store database, wherein the plurality of columns of the column store database include explicit columns for storing data that fits into key-and-value formats of the explicit columns and a semi-structured column for storing data that does not fit into the key-and-value formats of the explicit columns;
   prior to loading the received data to any of the plurality of columns of the column store database, determining, by a processor, whether a format of the received data is compatible with the key-and-value formats of the explicit columns of the column store database;
   in response to a determination that the format of the received data is compatible with the key-and-value formats of the explicit columns of the column store database, loading, by the processor, the received data to one explicit column of the explicit columns of the column store database, wherein loading the received data to the explicit column comprises:
      determining a key-and-value format of the received data,
      matching a key of the key-and-value format of the received data to a key of the explicit column, and
      loading the received data to the explicit column whose key matches the key of the key-and-value format of the received data;
   in response to a determination that the format of the received data is not compatible with the key-and-value formats of the explicit columns of the column store database, loading, by the processor, the received data to the semi-structured column of the column store database; and
   formatting, by the processor, the received data in the semi-structured column with an optimal search format, including adding a keyword that describes the received data.

2. The method of claim 1, further comprising searching said semi-structured column in response to search queries.

3. The method of claim 1, wherein formatting the received data with said optimal search format further includes extracting a portion of the received data and placing the portion of the received data in a newly created explicit column having a new key-and-value format.

4. The method of claim 2, wherein searching said semi-structured column in response to said search queries includes searching said semi-structured column when said search queries fail to match the explicit columns in said column store database.

5. The method of claim 1, wherein said semi-structured column further stores data having formats that are unknown to said column store database.

6. The method of claim 3, wherein formatting the received data with said optimal search format further includes reformatting the received data with indexing information in addition to information in the new key-and-value format.

7. The method of claim 1, further comprising:
   loading the received data to both the semi-structured column and an existing explicit column of the explicit columns of the column store database in response to a determination that the received data belongs to information already stored in the existing explicit column of the column store database.

8. A system for formatting semi-structured data in a column store database, comprising:
   a processor; and
   a memory storing instructions that when executed cause the processor to:
      receive data from a data source to be stored in one of a plurality of columns of the column store database, wherein the plurality of columns of the column store database include explicit columns for storing data that fits into key-and-value formats of the explicit columns and a semi-structured column for storing data that does not fit into the key-and-value formats of the explicit columns;
      prior to loading the received data to any of the plurality of columns of the column store database, determine whether a format of the received data is compatible with the key-and-value formats of the explicit columns of the column store database;
      in response to a determination that the format of the received data is compatible with the key-and-value formats of the explicit columns of the column store database, load the received data to one explicit column of the explicit columns of the column store database, wherein, to load the received data to the explicit column, the processor is to:
         determine a key-and-value format of the received data,
         match a key of the key-and-value format of the received data to a key of the explicit column, and load the received data to the explicit column whose key matches the key of the key-and-value format of the received data;

in response to a determination that the format of the received data is not compatible with the key-and-value formats of the explicit columns of the column store database, load the received data to the semi-structured column of the column store database; and format the received data in the semi-structured column with an optimal search format, including adding a keyword that describes the received data.

9. The system of claim 8, wherein the instructions are executable to cause the processor to:

search the semi-structured column in response to a search query;

in response to finding semi-structured data in the semi-structured column in response to the search query, analyze the search query for metadata; and reformat the semi-structured data in the semi-structured column for optimal search characteristics, including adding the metadata to the semi-structured data in the semi-structured column.

10. The system of claim 8, wherein, to format the received data in the semi-structured column with the optimal search format, the instructions are executable to cause the processor to add indexing information to the keyword.

11. The system of claim 8, wherein the instructions are executable to cause the processor to:

load the received data into both the semi-structured column and an existing explicit column of the explicit columns of the column store database in response to a determination that the received data belongs to information already stored in the existing explicit column of the column store database.

12. A non-transitory computer readable storage medium storing program instructions that, when executed, cause a processor to:

receive data from a data source to be stored in one of a plurality of columns of a column store database, wherein the plurality of columns of the column store database include explicit columns for storing data that fits into key-and-value formats of the explicit columns and a semi-structured column for storing data that does not fit into the key-and-value formats of the explicit columns;

prior to loading the received data to any of the plurality of columns of the column store database, determine whether a format of the received data is compatible with the key-and-value formats of the explicit columns of the column store database;

in response to a determination that the format of the received data is compatible with the key-and-value formats of the explicit columns of the column store database, load the received data to one explicit column of the explicit columns of the column store database, wherein, to load the received data to the explicit column, the processor is to:

determine a key-and-value format of the received data, match a key of the key-and-value format of the received data to a key of the explicit column, and load the received data to the explicit column whose key matches the key of the key-and-value format of the received data;

in response to a determination that the format of the received data is not compatible with the key-and-value formats of the explicit columns of the column store database, load the received data to the semi-structured column of the column store database; and format the received data in the semi-structured column with an optimal search format, including adding a keyword that describes the received data.

13. The non-transitory computer readable storage medium of claim 12, wherein, to format the received data in the semi-structured column with the optimal search format, the program instructions are executable to cause the processor to:

extract a portion of the received data; and place the portion of the received data in a newly created explicit column having a new key-and-value format.

14. The non-transitory computer readable storage medium of claim 12, wherein the program instructions are executable to cause the processor to:

search the semi-structured column in response to a search query;

in response to finding semi-structured data in the semi-structured column in response to the search query, analyze the search query for metadata; and reformat the semi-structured data in the semi-structured column for optimal search characteristics by adding the metadata to the semi-structured data in the semi-structured column.

15. The non-transitory computer readable storage medium of claim 12, wherein the program instructions are executable to cause the processor to:

load the received data to both the semi-structured column and an existing explicit column of the explicit columns of the column store database in response to a determination that the received data belongs to information already stored in the existing explicit column of the column store database.

16. The non-transitory computer readable storage medium of claim 12, wherein the semi-structured column further stores data having formats that are unknown to the column store database.

17. The system of claim 8, wherein the semi-structured column further stores data having formats that are unknown to the column store database.

* * * * *